US011420677B2

(12) United States Patent
Crowley et al.

(10) Patent No.: US 11,420,677 B2
(45) Date of Patent: Aug. 23, 2022

(54) MOUNTING ASSEMBLY FOR A STEERABLE WHEEL WITH VARIABLE TRACK WIDTH

(71) Applicant: AGCO Corporation, Duluth, GA (US)

(72) Inventors: Mark Aron Crowley, Spirit Lake, IA (US); James McGrath Slawson, Spirit Lake, IA (US); Nathan Stewart Felix, Jackson, MN (US)

(73) Assignee: AGCO CORPORATION, Duluth, GA (US)

( * ) Notice: Subject to any disclaimer, the term of this patent is extended or adjusted under 35 U.S.C. 154(b) by 288 days.

(21) Appl. No.: 16/659,746

(22) Filed: Oct. 22, 2019

(65) Prior Publication Data

US 2020/0130741 A1 Apr. 30, 2020

Related U.S. Application Data

(60) Provisional application No. 62/749,997, filed on Oct. 24, 2018.

(51) Int. Cl.
*B62D 9/00* (2006.01)
*B62D 3/14* (2006.01)
(Continued)

(52) U.S. Cl.
CPC .............. *B62D 9/00* (2013.01); *A01B 63/006* (2013.01); *B62D 1/02* (2013.01); *B62D 3/14* (2013.01);
(Continued)

(58) Field of Classification Search
CPC .............. A01B 63/006; B62D 33/0617; B62D 49/0678; B62D 9/00; B62D 1/02;
(Continued)

(56) References Cited

U.S. PATENT DOCUMENTS 2,911,229 A 11/1959 Strehlow
5,039,129 A * 8/1991 Balmer .................... B60G 3/04
180/308

(Continued)

FOREIGN PATENT DOCUMENTS

GB 1060944 A 3/1967
JP S6277283 A 4/1987
WO 96/36500 A1 11/1996

OTHER PUBLICATIONS

UK Intellectual Property Office, Search Report Prepared for related GB Application No. GB1818639.5 , dated May 8, 2019.

*Primary Examiner* — Paul N Dickson
*Assistant Examiner* — Caitlin Anne Miller

(57) ABSTRACT

A wheel-mounting assembly for an agricultural utility vehicle includes a chassis and a telescopic axle arrangement fixed to the chassis. The telescopic axle arrangement includes an inner axle telescopically received in an outer axle, which is fixed to the chassis. A wheel-support assembly is mounted to an outboard end of the inner axle. A steering-control actuator is connected between the inner axle and the wheel-support assembly. The steering-control actuator is connected to the inner axle through an opening provided in the outer axle, which allows the steering-control actuator to translate together with the inner axle when track width is adjusted.

16 Claims, 6 Drawing Sheets

(51) Int. Cl.
  *B62D 7/18*  (2006.01)
  *B62D 1/02*  (2006.01)
  *B62D 33/06* (2006.01)
  *A01B 63/00* (2006.01)
  *B62D 7/16*  (2006.01)
  *B62D 49/06* (2006.01)
  *B60G 7/00*  (2006.01)

(52) U.S. Cl.
  CPC ............... *B62D 7/163* (2013.01); *B62D 7/18* (2013.01); *B62D 33/0617* (2013.01); *B62D 49/0678* (2013.01); *B60G 7/005* (2013.01); *B60G 2300/40* (2013.01)

(58) Field of Classification Search
  CPC . B62D 3/14; B62D 7/163; B62D 7/18; B60G 2300/40; B60G 2300/08; B60G 7/005
  See application file for complete search history.

(56) References Cited

U.S. PATENT DOCUMENTS

| | | | |
|---|---|---|---|
| 5,716,071 A * | 2/1998 | Stanley | B62D 53/00 |
| | | | 33/708 |
| 7,168,717 B2 * | 1/2007 | Wubben | B60B 35/001 |
| | | | 280/124.127 |
| 8,020,648 B2 * | 9/2011 | Otto | B60G 99/004 |
| | | | 180/6.48 |
| 8,042,817 B2 * | 10/2011 | Motebennur | B62D 49/0678 |
| | | | 280/5.514 |
| 8,376,078 B2 * | 2/2013 | Hiddema | B60B 35/001 |
| | | | 180/209 |
| 9,079,470 B2 * | 7/2015 | Slawson | B60G 3/01 |
| 9,290,074 B2 | 3/2016 | Slawson | |
| 9,724,966 B2 * | 8/2017 | Daffue | B60B 35/1045 |
| 10,518,580 B2 * | 12/2019 | Moen | B60B 35/109 |
| 10,766,329 B2 * | 9/2020 | Slawson | B60G 17/005 |
| 10,798,863 B2 * | 10/2020 | Hafvenstein | A01M 7/0082 |
| 2010/0283218 A1 * | 11/2010 | Goers | B60B 35/1054 |
| | | | 280/269 |

* cited by examiner

MOUNTING ASSEMBLY FOR A STEERABLE WHEEL WITH VARIABLE TRACK WIDTH

CROSS-REFERENCE TO RELATED APPLICATION

This application claims the benefit of the filing date of U.S. Provisional Patent Application 62/749,997, "Mounting Assembly for a Steerable Wheel with Variable Track Width," filed Oct. 24, 2018, the entire disclosure of which is incorporated herein by reference.

FIELD

This disclosure relates to utility vehicles having variable track width, such as agricultural row crop sprayers and spreaders. In particular, the disclosure relates to steering mechanisms for steerable wheels mounted to such vehicles.

BACKGROUND

Some agricultural vehicles are configured to be operated in fields among row crops. Application machines such as self-propelled or trailed sprayers, for example, may have wheels configured to pass between crop rows and a spray boom that extends outwardly from the vehicle to spray the crop as the machine travels through the field. In order to avoid damaging the crops as the vehicle moves through the field, each of the wheels must have the proper width to travel between the rows, and the track width (the lateral distance between the wheels) must match row spacing or predefined 'tramlines' so that the wheels do not damage the growing crop.

Many agricultural sprayers on the market today offer functionality to change the track width to meet the requirements of the task at hand. Various different mechanisms exist to deliver this functionality. One known system involves wheel-support assemblies mounted to a vehicle chassis by a telescopic mechanism. U.S. Pat. No. 9,290,074, "Machine suspension and height adjustment," issued Mar. 22, 2016, discloses such a telescopic arrangement. FIG. 5 of U.S. Pat. No. 9,290,074 shows a telescoping axle arrangement with an outer axle secured to a chassis and an inner axle slidingly engaged with the outer axle allowing the wheel to shift laterally relative to the chassis.

FIG. 32 of U.S. Pat. No. 9,290,074 shows a steering actuator pivotably coupled to the inner axle and to a flange associated with the wheel-support assembly. Due to the requirement for the inner axle to slide in and out of the outer axle, the steering actuator is mounted very close to the wheel-support assembly, leading to an acute angle between the steering actuator and the wheel-support assembly. The acute angle results in a low moment of force imparted on the wheel-support assembly during steering and a requirement for a large bore actuator with tailored mounting brackets to ensure sufficient clearance.

There is a need for a more robust steering mechanism for use with a utility vehicle having variable track-width functionality.

BRIEF SUMMARY

A wheel-mounting assembly for a utility vehicle includes a chassis, an outer axle fixed to the chassis, an inner axle telescopically received in the outer axle, a wheel-support assembly mounted to an outboard end of the inner axle, and a steering actuator connected between the inner axle and the wheel-support assembly. The steering actuator is connected to the inner axle through an opening provided in the outer axle.

Advantageously, by providing an opening, aperture or 'window' in the outer axle, the steering actuator can be connected to the inner axle in a robust manner while still allowing the outer axle to bear the load of the inner axle and without impinging upon the variable track-width functionality. The angle at which the steering actuator forms with the wheel-support assembly can be much shallower, thus requiring a smaller diameter actuator to deliver an equivalent moment of force upon the wheel-support assembly during steering. The steering forces involved are in turn reduced, resulting in a more robust assembly.

The steering actuator may be coupled to the inner axle via a carriage secured to the inner axle, wherein the opening is shaped so as to permit the carriage to move as the track width is adjusted. It should be understood that the opening is formed so as to be framed by portions of the outer axle that remain static with respect to the chassis.

The outer axle and inner axle may be formed with a polygonal cross section along a telescoping axis so as to prevent relative rotation. For example, the outer axle and inner axle are formed with a rectangular or square cross section.

The opening may be formed in a vertical face of the outer axle so as to reduce the risk of particulate dirt from entering adjacent the sliding mechanism. Alternatively, the opening could be formed in top or bottom surfaces of the outer axle.

In one embodiment, the inner axle comprises a pivot element at the outboard end, wherein the wheel-support assembly comprises a kingpin retained in the pivot element, and wherein the kingpin has an axis that corresponds to a steering axis.

In one example embodiment, a track-width-adjustment actuator is coupled between the chassis and the inner axle to facilitate adjustment of the vehicle track width remotely from a driver's cab for example, or even automatically.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

FIG. 6 is a perspective view of the wheel-mounting assembly of FIG. 3 shown with the steering actuator removed.

DETAILED DESCRIPTION

Figure 1:
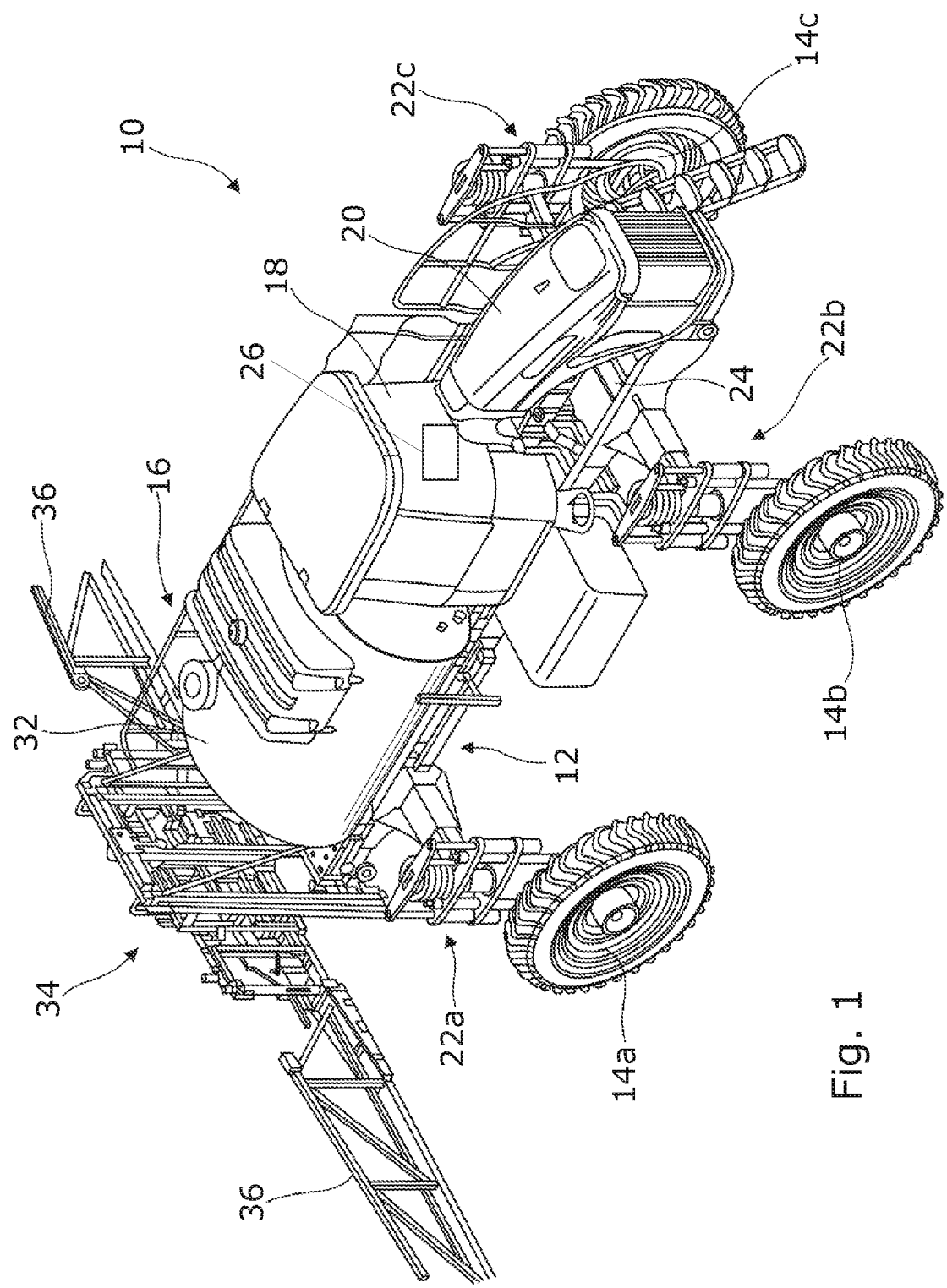
FIG. 1 is a perspective view of an agricultural sprayer embodying wheel-mounting assemblies.
Figure 2:
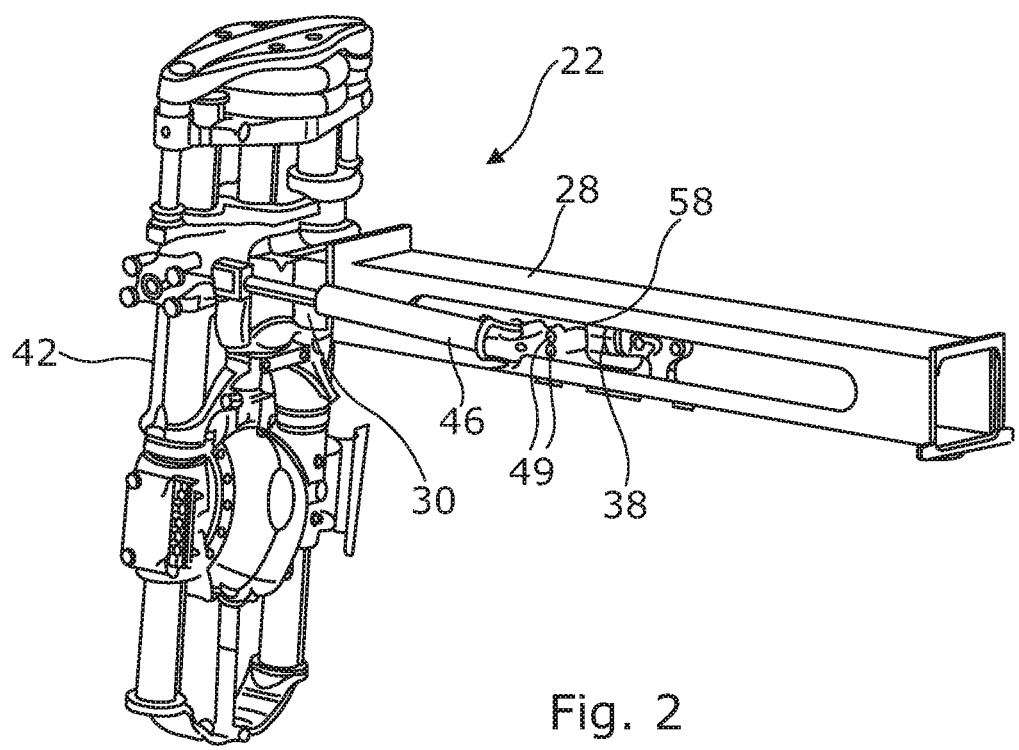
FIG. 2 is a perspective view of a wheel-mounting assembly shown in a narrow track-width configuration.
Figure 3:
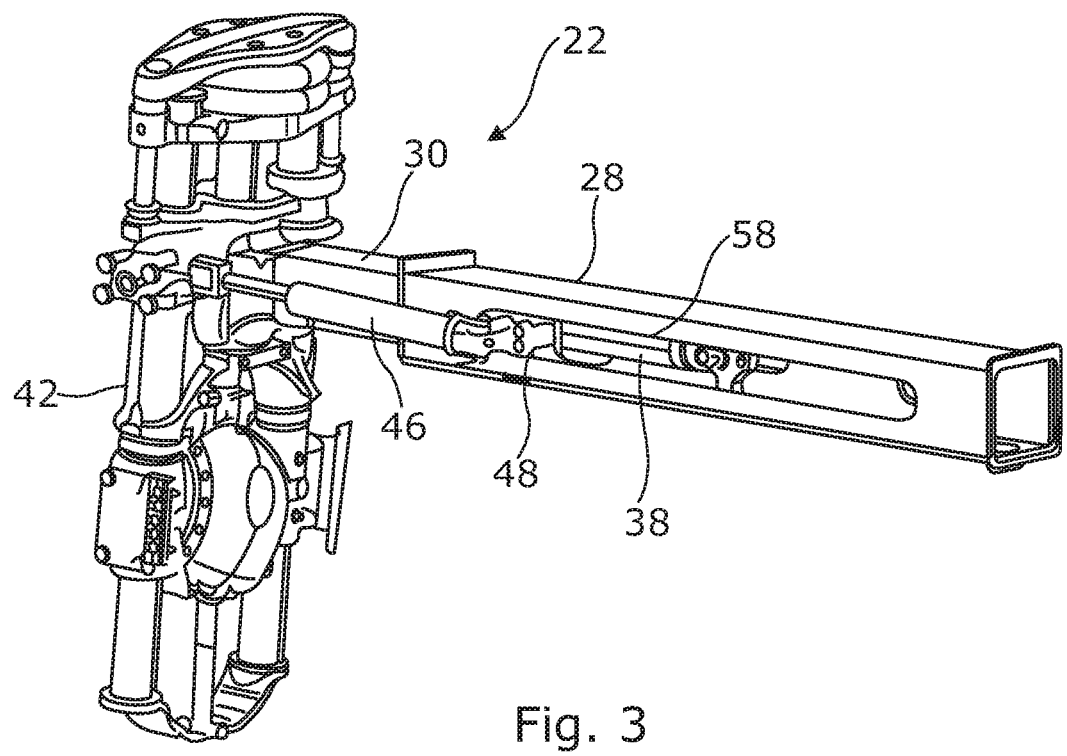
FIG. 3 is a perspective view of the wheel-mounting assembly of FIG. 2 shown in a wide track-width configuration.
Figure 4:
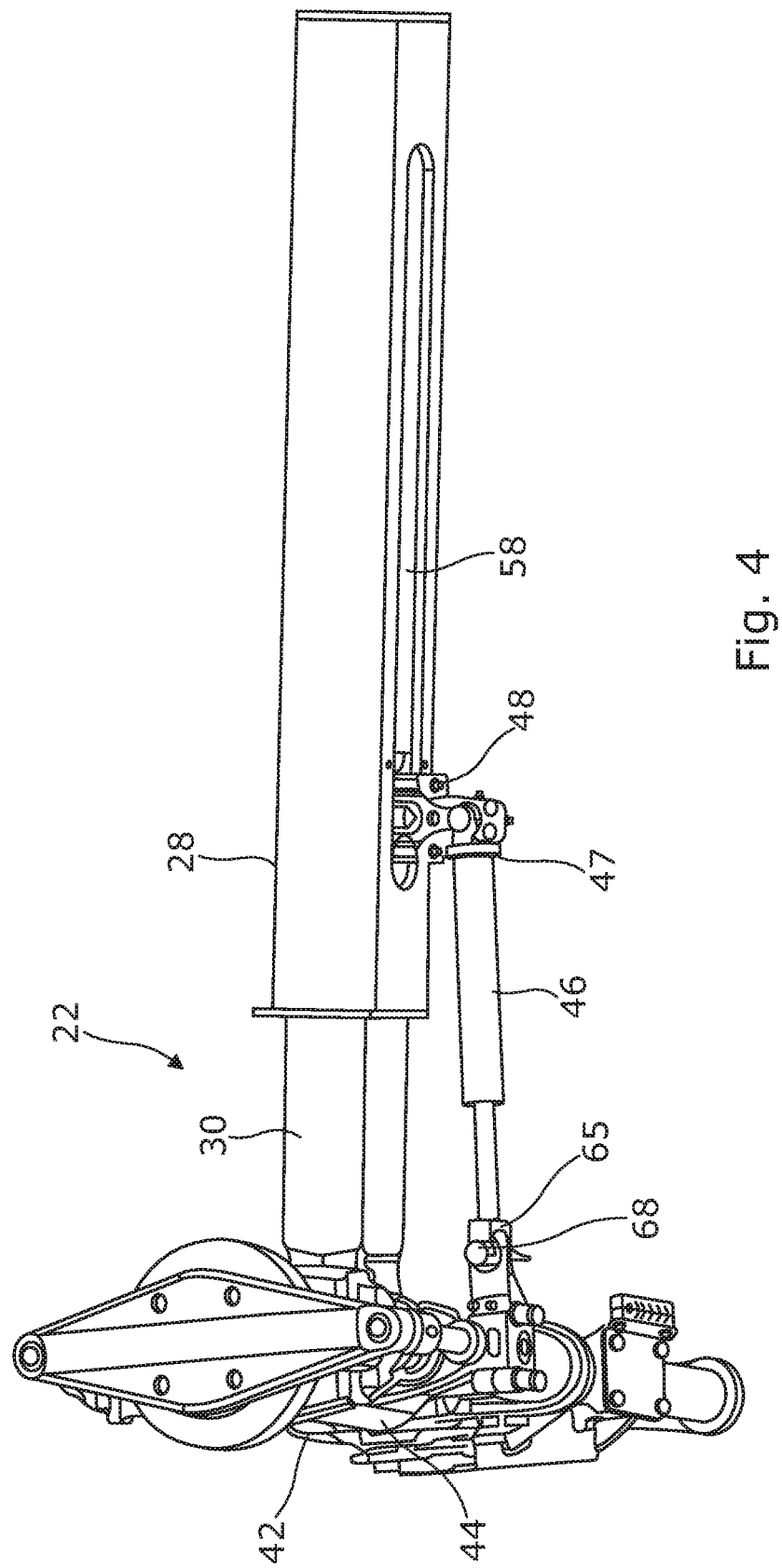
FIG. 4 is a perspective view from above of the wheel-mounting assembly of FIG. 3.
Figure 5:
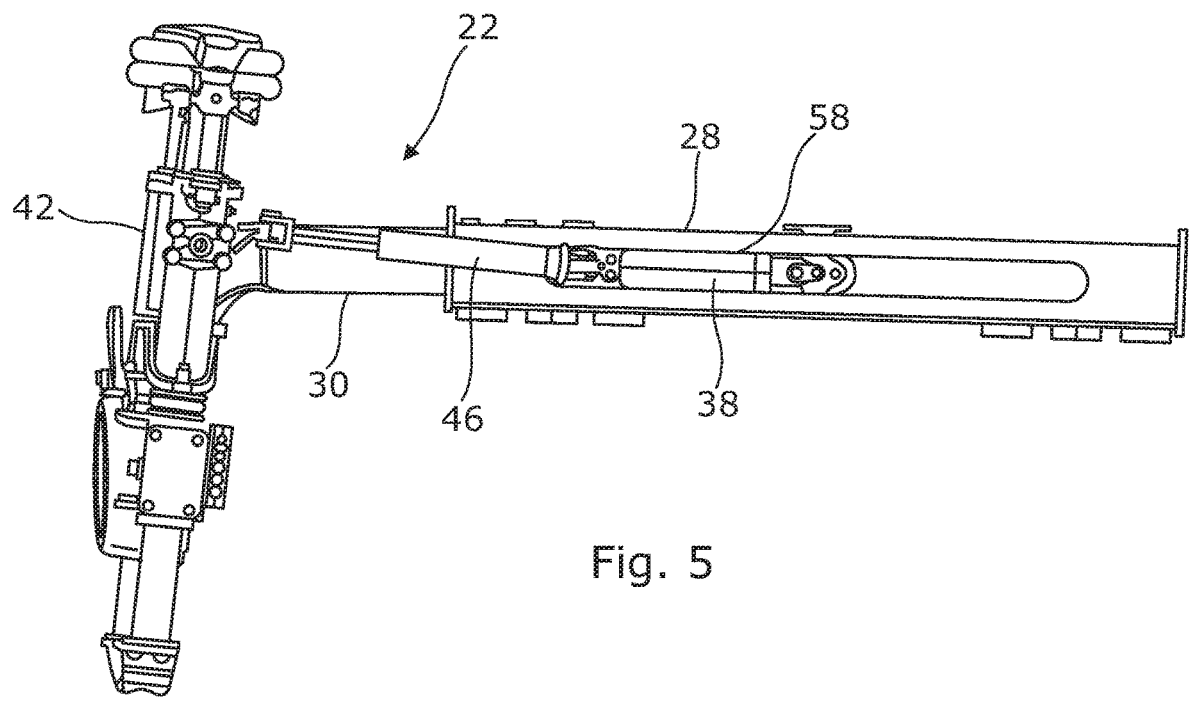
FIG. 5 is a front view of the wheel-mounting assembly of FIG. 3.

All references cited herein are incorporated herein in their entireties. If there is a conflict between definitions herein and in an incorporated reference, the definition herein shall control.

The illustrations presented herein are not actual views of any vehicle or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 shows an exemplary agricultural vehicle in the form of a self-propelled sprayer 10. The sprayer 10 broadly includes a chassis 12, a plurality of wheels 14 or other ground-engaging elements supporting the chassis 12 above a ground surface, an application system 16, an operator cabin 18, and an engine compartment 20. A plurality of wheel-mounting assemblies 22 (of which, three wheel-mounting assemblies 22a, 22b, 22c are visible in FIG. 1) interposed between the wheels 14 and the chassis 12 support the chassis 12 on the wheels 14 and provide suspension, track-width adjustment, and steering functions, as discussed in greater detail below.

Certain components of the sprayer 10 have been omitted from the figures for simplicity of illustration and to show certain features of the sprayer 10 that would otherwise be concealed. The engine, for example, has been omitted to illustrate components of the sprayer frame, including portions of the front axle 24. Certain hydraulic lines, such as hydraulic lines running to and from the assemblies 22, are also omitted. The sprayer 10 is illustrated and discussed herein as an exemplary machine with which the wheel-mounting assemblies 22 may be used. It will be appreciated by those skilled in the art that the wheel-mounting assemblies 22 may be used with other machines including other types of sprayers or other utility vehicles or mobile machines that would benefit from the advantages of the various embodiments of the wheel-mounting assemblies 22 disclosed herein, such as track-width adjustment and independent suspension.

The sprayer 10 includes a pair of front wheels 14b, 14c and a pair of rear wheels 14a, plus another wheel hidden from view in FIG. 1 (referred to generally as wheels 14) of the appropriate size and shape to allow the sprayer 10 to travel among row crops and along tramlines with minimal crop disturbance.

One or more drive motors may be associated with one or more of the wheels 14 for driving rotation of the wheel or wheels relative to the chassis 12 to thereby propel the sprayer 10 in forward and reverse directions. In the illustrated embodiment, a separate hydraulic motor is drivingly connected to each wheel 14 such that each of the wheels 14 may be driven independently to propel the sprayer 10. Either two or all four of the wheels 14 may be steerable. In some embodiments, the steering functionality of some of the wheels 14 may be selectively enabled and disabled. By way of example, the front wheels 14b, 14c may always be steerable while supplemental steering provided by the rear wheels 14a, 14d may be selectively enabled and disabled. An operator may control the drive motors and steering functions of the wheels 14, including enabling and disabling the steering ability of certain of the wheels 14, from one or more user interface 26 (e.g., a handle, a knob, a touch screen, etc.) in the operator cabin 18.

The application system 16 is supported on the chassis 12 and may be conventional in nature. In the illustrated embodiment, the application system 16 includes a liquid holding tank 32 and a delivery system 34 for applying a liquid from the holding tank 32 to a crop or field. The holding tank 32 may have a capacity of between two hundred gallons and two thousand gallons and, more specifically, may have a capacity of 700, 900, 1,100, or 1,300 gallons. The delivery system 34 includes a pair of booms 36 supporting hoses, pumps, and spray nozzles or similar components for dispersing or otherwise applying the contents of the tank to a crop. Alternatively, the application system 16 may be configured to apply dry material to a field and therefore may include a hopper and a mechanism for dispersing particulate material from the hopper, such as a pneumatic spreader or one or more spinners.

The operator cabin 18 or "cab" is supported on the chassis 12 and positioned forward of the application system 16.

The sprayer 10 includes mechanisms for adjusting the track width of the wheels 14 to accommodate, for example, different spacing needs for row crops. With reference to FIGS. 2-6, the wheel-mounting assemblies 22 include a telescoping axle with an outer axle 28 and an inner axle 30 associated with each wheel 14, wherein the inner axle 30 slidingly engages the outer axle 28 and allows the wheel 14 to shift laterally relative to the chassis 12.

It should be understood that FIGS. 2-6 show the wheel-mounting assembly 22 for only one wheel for sake of clear explanation. The illustrated and described wheel-mounting assembly 22 and associated variable track-width functionality can be applied also to the other wheels 14 of sprayer 10. The following description makes reference to only the wheel-mounting assembly 22 illustrated. However, it should be appreciated that the description applies also to one or more of the other wheel-mounting assemblies 22.

A hydraulic actuator 38 is arranged to drive the inner axle 30 inwardly and outwardly to shift the position of the associated wheel 14. In some embodiments, the hydraulic actuator 38 may be controllable by the user interface 26. The outer axle 28 is fixed to the chassis 12 by welds or bolts, for example. In the illustrated embodiment, the outer axle 28 of both front wheels 14b, 14c is provided by a shared tubular structure having a rectangular cross section or internal profile in which respective inner axles 30 are telescopically received at opposite ends. Similarly, the outer axle 28 of both rear wheels is provided by another shared tubular structure. It should be appreciated however that in an alternative embodiment, each wheel-mounting assembly 22 may comprise an outer axle that is independent of the other wheel-mounting assemblies 22.

Each wheel-mounting assembly 22 further includes a wheel-support assembly 42 which connects to a hub of the associated wheel 14 and to an outboard end of one of the inner axles 30 such that the wheel 14 and the wheel-support assembly 42 shift laterally as a single unit relative to the chassis 12 when the inner axle 30 is shifted relative to the outer axle 28 to adjust the track width of the sprayer 10. In some embodiments, the wheel-support assemblies 42 include height adjustment components for raising and lowering the chassis 12 of the sprayer 10 between various operating positions. Each of the wheel-support assemblies 42 may include one or more actuators for adjusting a height of the chassis. In some embodiments, the actuators are hydraulic actuators such as linear or rotary hydraulic actuators. However, a detailed explanation of the height adjustment components is not necessary for an understanding of the present disclosure.

Each inner axle 30 includes a pivot element 44 at the outboard end in the form of a generally cylindrical sleeve (FIG. 7) which receives a kingpin (hidden from view) associated with the wheel-support assembly 42. As such, each wheel-support assembly 42 is pivotably mounted to the associated inner axle 30 by the kingpin retained in the pivot element 44. Each wheel-support assembly 42 can pivot around a steering axis 's' (FIG. 6) that is parallel to, and coaxial with, the kingpin to thereby steer the sprayer 10.

Each wheel-mounting assembly 22 includes a steering-control actuator 46 which, in the illustrated embodiment, is a hydraulic actuator. The steering-control actuator 46 is connected between the inner axle 30 and the wheel-support assembly 42 in a manner that will be described in more detail below.

Figure 7:
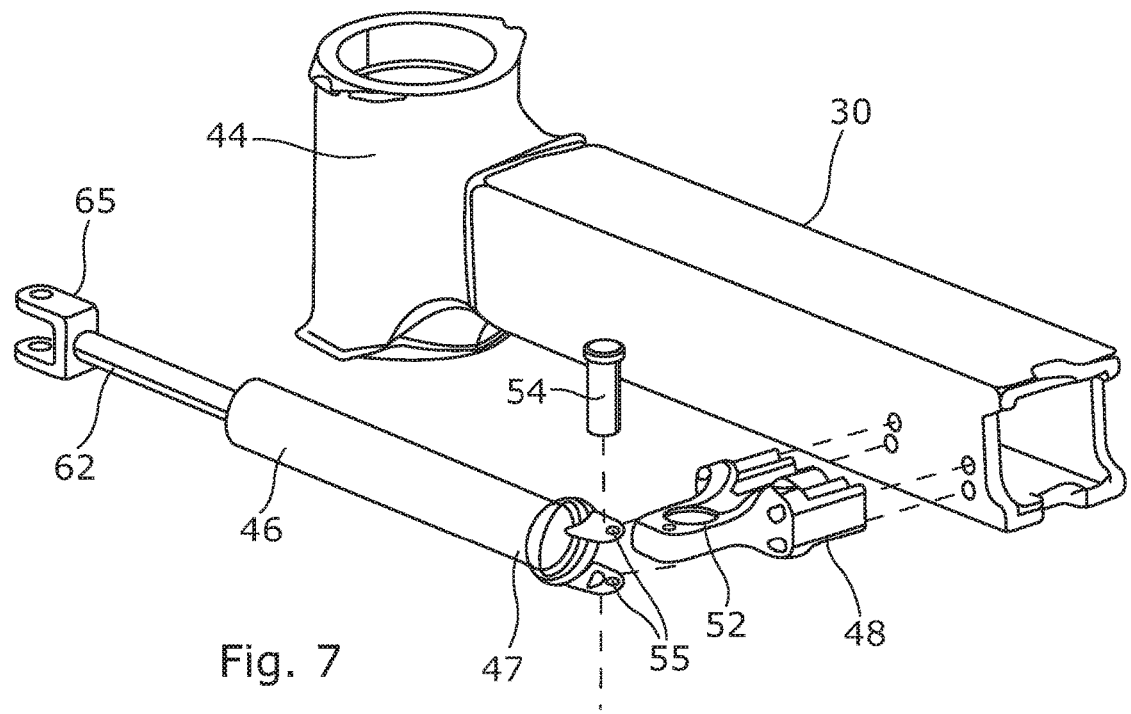
FIG. 7 is an exploded view of part of the wheel-mounting assembly of FIG. 2.
Figure 8:
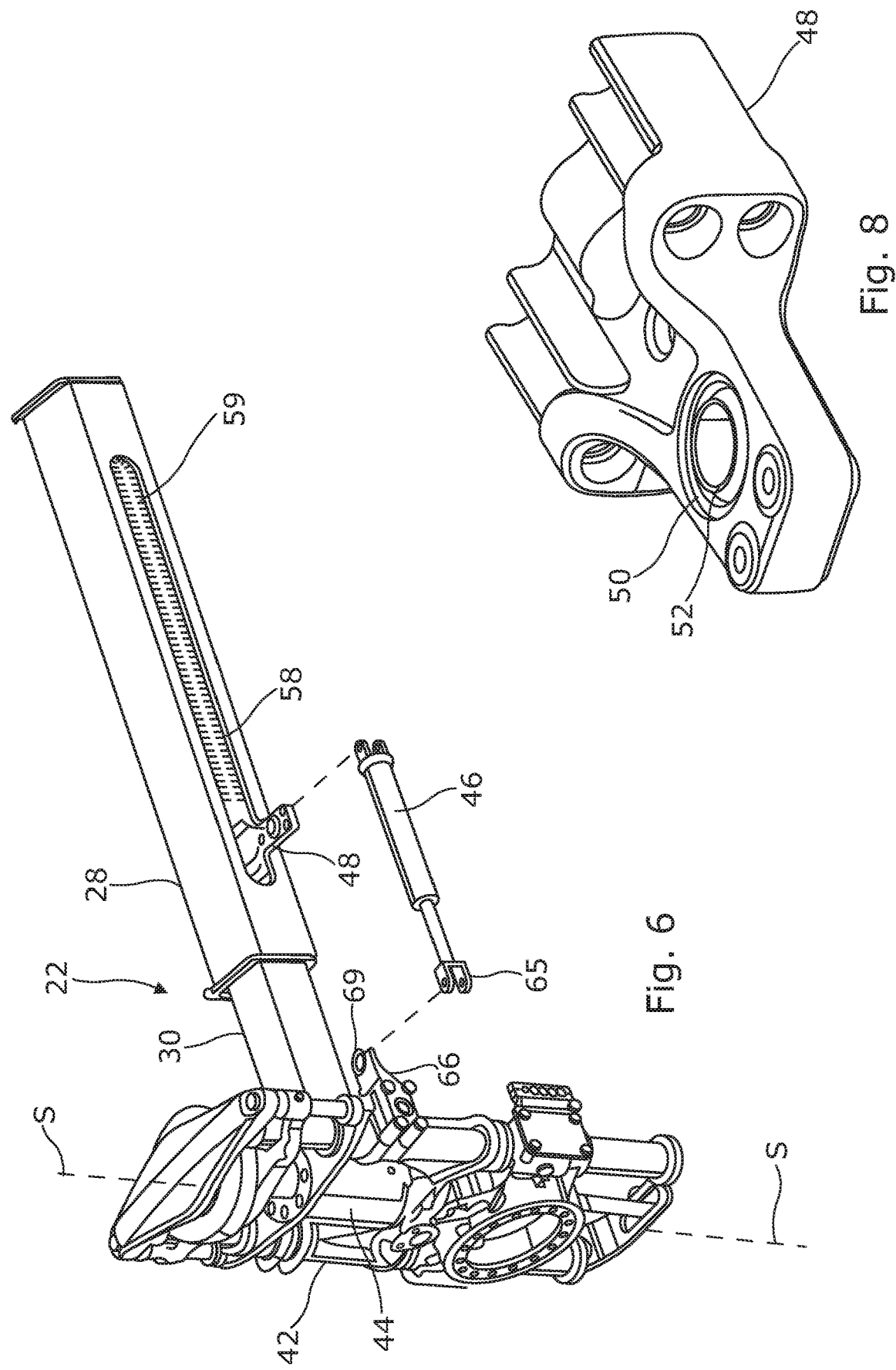
FIG. 8 is a perspective view of the carriage from the wheel-mounting assembly of FIG. 2.

An inboard end 47 of the steering-control actuator 46 is pivotably coupled to a carriage 48 which is itself secured to a vertical face of the inner axle 30 by bolts 49. Carriage 48 is a machined or cast body which provides a connection point for the steering-control actuator 46 on the inner axle 30. With reference to FIGS. 7 and 8, the carriage 48 presents a vertical bore 50 in which a ball joint 52 is retained. A pin 54 is inserted through a first clevis 55 of the steering-control actuator 46 and through the ball joint 52 to provide a pivotable joint between the actuator 46 and carriage 48.

The carriage 48 is secured to the inner axle 30 through an opening or 'window' 58 provided in a vertical face of the outer axle 28. The opening 58 is elongate and permits the carriage 48 to slide freely with the inner axle 30 as the track width is adjusted without compromising the structural integrity of the outer axle 28. A brush seal 59 (shown in FIG. 6 only) is mounted around the peripheral edge of the opening 58 to limit the ingress of dust and particulate matter into the outer axle 28.

An outboard end 62 of the steering-control actuator 46 comprises a second clevis 65 pivotably coupled to the wheel-support assembly 42 at a bracket 66. A pin 68 is inserted through the second clevis 65 and through a bore 69 provided in the bracket 66 to provide the pivotable coupling.

Steering of the associated wheel 14 around steering axis 's' is controlled by the steering-control actuator 46. It should be appreciated that the steering-control actuator 46 travels together with the inner axle 30. As such, the steering-control functionality is not affected by adjustment of the track width when the inner axle 30 slides with respect to the outer axle 28.

In an alternative embodiment, each wheel-support assembly may be mounted to the chassis by a parallel pair of telescopic inner/outer axles, wherein the steering-control actuator is coupled to one of the pair of inner axles.

In yet another alternative embodiment, the opening is provided in a top surface of the outer axle.

Figure 9:
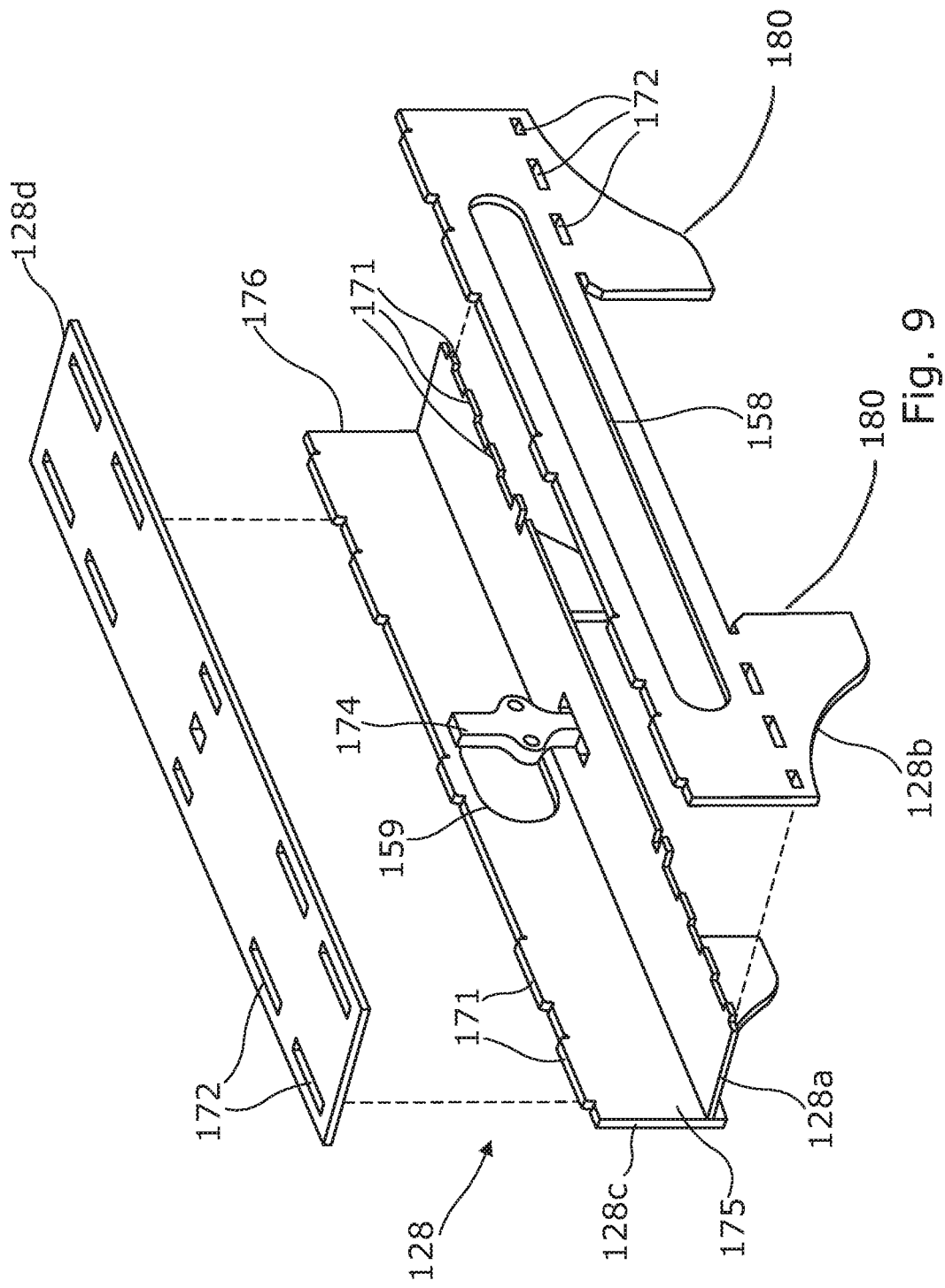
FIG. 9 is an exploded perspective view of an outer axle construction forming part of a wheel-mounting assembly.

Although the outer axle 28 is shown in FIGS. 2-6 as having a unitary tube that can be fixed to a vehicle chassis, it should be understood that the outer axle may be assembled from multiple parts that together present a channel or tube having an inner profile that is suitable for receiving the inner axle in a sliding, weight-bearing, relationship. FIG. 9 shows an outer axle 128 in accordance with an alternative embodiment, the outer axle 128 being provided by an assembly of multiple parts.

The outer axle 128 comprises a base part 128a, a front part 128b, a rear part 128c and a lid 128d. The four parts 128a-d are assembled to form the outer axle 128 with a square tubular construction having a rectangular or even a square internal section for receiving an inner axle with a confirming external profile. The parts 128a-d are secured together using at least one of several known techniques such as welding, gluing, or riveting. In the illustrated embodiment of FIG. 9, alignment tabs 171 and corresponding slots 172 are provided to assist accurate assembly.

It should be appreciated that FIG. 9 shows an outer axle 128 for two opposite wheels which are provided by a shared tubular structure having a rectangular cross section or internal profile in which respective inner axles are telescopically received at opposite ends. An anchor element 174 is secured midway between the two outboard ends 175, 176 of the outer axle 128. The anchor element 174 is provided with two holes for pivotal attachment of track-adjusting hydraulic actuators (not shown in FIG. 9 but similar to actuators 38 shown in FIGS. 2 and 3), wherein the actuators for the two respective inner axles extend outwardly away from the anchor element 174 for connection to the inner axles.

The front part 128b and the rear part 128c in the illustrated embodiment include downwardly-extending portions 180 formed therein and which mate with a longitudinally-extending chassis 12 and serve as means to secure the outer axle 128 to the chassis by welding or other suitable securing means. The front part 128b includes an elongate opening 158 through which a steering-control actuator can be connected to the inner axle. The rear part 128c includes a service opening 159 for providing access to the anchor element 174 and actuators connected thereto.

Although shown and described thus far as a separate component or assembly, the outer axle or axles may be integrated into the chassis 12 of the sprayer 10.

In summary, there is provided a wheel-mounting assembly for an agricultural utility vehicle which includes a chassis and a telescopic axle arrangement fixed to the chassis. The telescopic axle arrangement includes an inner axle telescopically received in an outer axle which is fixed to the chassis. A wheel-support assembly is mounted to an outboard end of the inner axle. A steering-control actuator is connected between the inner axle and the wheel-support assembly. The steering-control actuator is connected to the inner axle through an opening provided in the outer axle which allows the steering-control actuator to translate together with the inner axle when track width is adjusted.

Although the disclosure has been described with reference to the exemplary embodiments illustrated in the attached drawing figures, it is noted that equivalents may be employed and substitutions made herein without departing from the scope as recited in the claims.

The invention claimed is:

1. A wheel-mounting assembly for a utility vehicle comprising:
   an outer axle defining an opening therein;
   an inner axle telescopically received in the outer axle;
   a wheel-support assembly mounted to an outboard end of the inner axle; and
   a steering-control actuator connected between the inner axle and the wheel-support assembly, wherein the steering-control actuator is connected to the inner axle through the opening defined in the outer axle.

2. The wheel-mounting assembly of claim 1, further comprising a carriage secured to the inner axle through the opening, wherein the steering-control actuator is coupled to the carriage.

3. The wheel-mounting assembly of claim 1, wherein the outer axle and the inner axle each exhibit rectangular cross sections along a telescoping axis.

4. The wheel-mounting assembly of claim 3, wherein the opening is defined in a vertical face of the outer axle.

5. The wheel-mounting assembly of claim 1, further comprising a brush seal disposed around a peripheral edge of the opening.

6. The wheel-mounting assembly of claim 1, wherein the inner axle comprises a pivot element at the outboard end, wherein the wheel-support assembly comprises a kingpin retained in the pivot element, and wherein the kingpin has an axis that corresponds to a steering axis.

7. The wheel-mounting assembly of claim 1, wherein the steering-control actuator is disposed outside the outer axle.

8. An agricultural machine comprising:
   a chassis;
   a plurality of wheels, each wheel carried by a wheel-mounting assembly fixed to the chassis, each wheel-mounting assembly comprising:
   an outer axle fixed to the chassis and defining an opening therein;
   an inner axle telescopically received in the outer axle;
   a wheel-support assembly mounted to an outboard end of the inner axle; and
   a steering-control actuator connected between the inner axle and the wheel-support assembly, wherein the steering-control actuator is connected to the inner axle through the opening defined in the outer axle.

9. The agricultural machine of claim 8, wherein the wheel-mounting assemblies comprise a first wheel-mounting assembly and a second wheel-mounting assembly, wherein the second wheel-mounting assembly is laterally spaced from, and extends parallel to, the first wheel-mounting assembly.

10. The agricultural machine of claim 8, further comprising a plurality of track-width-adjustment actuators, each track-width-adjustment actuator coupled between the chassis and the inner axle of one of the wheel-support assemblies.

11. The agricultural machine of claim 10, further comprising an operator cabin and a user interface in the operator cabin, the user interface configured to control the track-width-adjustment actuators.

12. The agricultural machine of claim 8, further comprising an operator cabin carried by the chassis.

13. The agricultural machine of claim 12, further comprising a user interface element in the operator cabin, the user interface element configured to control driving and steering of the wheels.

14. The agricultural machine of claim 8, further comprising an application system carried by the chassis.

15. The agricultural machine of claim 14, wherein the application system comprises a pair of booms extending from the chassis.

16. The agricultural machine of claim 8, further comprising a holding tank carried by the chassis.

* * * * *